C. DRABEK.

SPRING SUSPENSION FOR VEHICLES.

APPLICATION FILED MAR. 22, 1916.

Reissued July 20, 1920. 14,918.

*Witnesses:*
*C. Patnotte*

*Inventor:*
*Charles Drabek.*

*By* *Jas. H. Griffin*
*Attorneys*

UNITED STATES PATENT OFFICE.

CHARLES DRABEK, OF CLEVELAND, OHIO, ASSIGNOR TO THE DRABEK EQUALIZER COMPANY, OF CLEVELAND, OHIO, A CORPORATION OF OHIO.

SPRING SUSPENSION FOR VEHICLES.

14,918. Specification of Reissued Letters Patent. Reissued July 20, 1920.

Original No. 1,119,937, dated December 8, 1914, Serial No. 805,535, filed December 9, 1913. Application for reissue filed March 22, 1916. Serial No. 86,015.

*To all whom it may concern:*

Be it known that I, CHARLES DRABEK, a citizen of the United States, and a resident of Cleveland, county of Cuyahoga, and State of Ohio, have invented a new and useful Improvement in Spring Suspensions for Vehicles, of which the following is a specification, the principle of the invention being herein explained and the best mode in which I have contemplated applying that principle, so as to distinguish it from other inventions.

The subject of the present invention is a spring suspension for vehicles, which is designed to reduce to a minimum the shocks caused by road obstructions and to give an easy and comfortable suspension for the body of the vehicle. In the present types of vehicles, referring more particularly now to automobiles, the springs are in many cases supplemented by various shock absorbing devices and it is necessary to supply such mechanism in addition to the regular springs in order to secure the easy riding qualities so much desired. My invention, on the other hand, secures this advantage without the aid of any auxiliary device, by first diminishing the travel transmitted from the axle, and then effectively cushioning such movement.

To the accomplishment of these and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
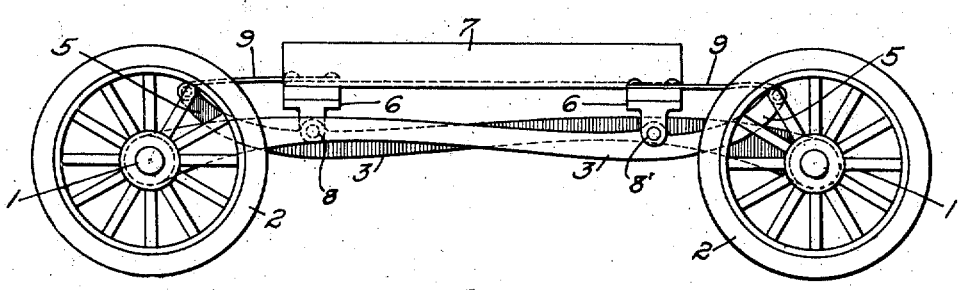

In said annexed drawing, Figure 1 is a side elevation of my invention, and

Figure 2:
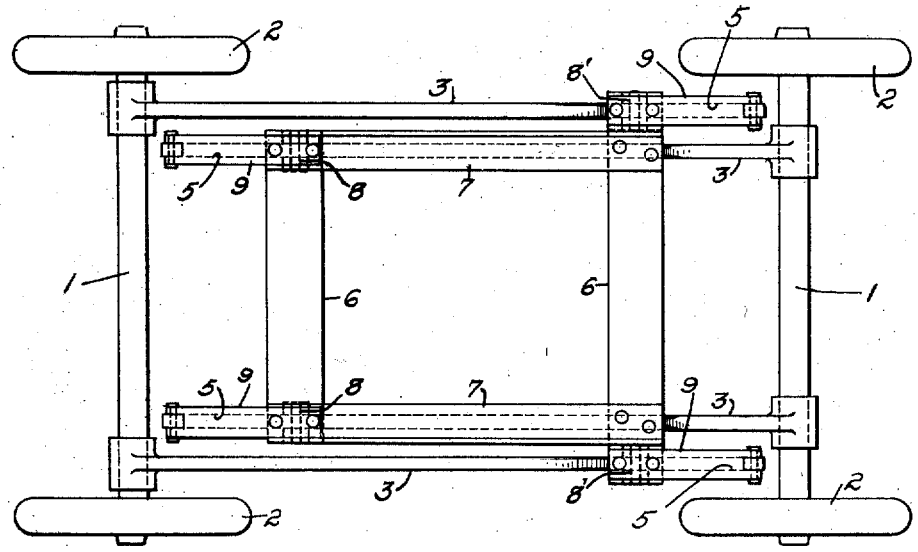

Fig. 2 is a plan view of the same.

In Fig. 1, I show two fixed supporting members or axles 1 mounted upon suitable wheels 2, such axles being, of course, parallel. To each of such axles are pivotally connected two spaced parallel frame members 3 which extend longitudinally of the vehicle and terminate adjacent to the other of such axles. Two of these frame members 3 are disposed between the first two, and are similarly attached to the other of the axles 1. Adjacent to the free ends 5 of said frame members there are mounted transverse members 6 which are spaced and are parallel and are each connected to such frame members 3. Such transverse members are pivotally connected to said frame members and are flattened upon the upper surface, adapting them to be rigidly connected to two longitudinally disposed members 7 which, together with such transverse members, form a platform to which the body of the vehicle is designed to be attached. It will be seen that the platform consisting of these four members is rigid, although it is pivotally supported at each corner upon one of said four frame members. Leaf springs 9 connect each of such transverse members 6 with the otherwise free end of the frame member 3 to which the transverse member is attached. The action of the present spring suspension will be readily seen from the foregoing description of the construction. Upon one of the wheels 2 striking an obstruction, that end of the axle 1 to which it is attached is moved upwardly, this action raising the attached end of the frame member 5 to a certain distance. The transverse member 6 which is attached to the frame member that is moved is, of course, also moved but through a much shorter distance than the axle by reason of the relative proportions of the two parts of the frame member on either side of the point of attachment of such transverse member. A resistance to such movement of the frame member is supplied by the spring which connects the transverse member to the end of the frame member. In this way the road shocks are distributed throughout the entire vehicle to some extent and are partially absorbed, thus preventing any annoying jars or shocks to the occupants of the vehicle as is the case with any of the spring suspension systems which are now in general use. The use of a rigid platform for the purpose of supporting the body member prevents the latter from being racked by any of the severe strains to which it is ordinarily subjected, and increases the life of the body and of the entire vehicle.

It is unnecessary to say that the shocks resulting from the movement of the vehicle over an uneven roadway are, by this spring suspension, transmitted substantially equally to the various parts of the body which is one object of such a device. The shocks are first diminished and cushioned, however, and the resultant movement given the body is very slight in proportion to the initial movement of the axles. No spring suspension now in use secures the present distribution of shocks although it is possible to distribute them to some extent by means of the so-called "platform" springs, which are open to the serious objection that they permit the body to sway badly when taking curves.

Other modes of applying the principle of my invention may be employed instead of the one explained, change being made as regards the mechanism herein disclosed, provided the means stated by any of the following claims or the equivalent of such stated means be employed.

It will be manifest that two of the frame members 3, 3, pivoted at 8, 8, and associated with one of the axles, constitute a pair of levers of the first class, having arms of unequal length, and that they coöperate with that particular axle and the member to which they are fulcrumed. Similarly, the other two frame members 3, 3, pivoted at 8′, 8′, perform the same function in connection with the other axle and the member to which they are fulcrumed.

I therefore particularly point out and distinctly claim as my invention:

1. In a vehicle, the combination with two fixed supporting members, of two frame members each pivotally attached at one end to one of said supporting members, two other frame members each pivotally attached at one end to the other of said supporting members, a transverse member connecting said two first-named frame members, a second transverse member connecting said two last-named frame members, connections between said transverse members, and resilient means connecting each of said transverse members to the frame members to which it is already attached, said resilient means being attached to the ends of said frame members.

2. In a vehicle, the combination with two fixed supporting members, of two fixed frame members each pivotally attached at one end to one of said supporting members, two other frame members each pivotally attached at one end to the other of said supporting members, a transverse member connecting said two first-named frame members intermediate the ends of the same, a second transverse member connecting said two last-named frame members intermediate the ends of the same, rigid connections between said transverse members, forming therewith a rigid platform, and resilient means connecting each of said transverse members to the frame members to which it is already attached, said resilient means being attached to the ends of said frame members.

3. In a vehicle, the combination with two fixed supporting members, of two frame members each pivotally attached at one end to one of said supporting members, two other frame members each pivotally attached at one end to the other of said supporting members, a transverse member connecting said two first-named frame members intermediate the ends of the same, a second transverse member connecting said two last-named frame members intermediate the ends of the same, two members connecting said transverse members and forming therewith a rigid platform, and resilient means connecting each of said transverse members with the free ends of said frame members to which said transverse members are attached.

4. In a vehicle, the combination with two axles, of two parallel spaced frame members each pivotally attached at one end to one of said axles, two other parallel spaced frame members each pivotally attached at one end to the other of said axles, two parallel spaced transverse members, each attached to two of said frame members intermediate the ends of the latter, other parallel spaced members connecting said transverse members and forming therewith a platform adapted to receive a vehicle body, and resilient leaves extending from the ends of said transverse members to the otherwise free ends of said frame members to which said transverse members are attached.

5. In a vehicle, the combination of a load-carrying member, a front axle, a rear axle, a pair of levers of the first class, having arms of unequal length, pivotally connected to the front axle and fulcrumed to the load-carrying member, with the long arms of the levers extending from their fulcrums to the front axle, resilient means coöperating with the short arms of said levers and the load-carrying member, a similar pair of levers pivotally connected to the rear axle and also fulcrumed to the load-carrying member, with the long arms of said levers extending from their fulcrums to the rear axle and crossing the long arms of the first-mentioned levers, and resilient means coöperating with the short arms of said latter pair of levers and the load-carrying member.

6. In a vehicle, the combination of a load-carrying member, a front axle, a rear axle, a pair of levers of the first class, having arms of unequal length, pivotally connected to the front axle and fulcrumed to the load-carrying member, with the long arms of the levers extending from their fulcrums to the front axle, springs coöperating with the short arms of said levers and the load-carrying member, a similar pair of levers associated with the rear axle and also fulcrumed to the load-carrying member, with the long arms of said levers extending from their fulcrums to the rear axle and crossing the long arms of the first-mentioned levers, and springs coöperating with the short arms of said latter pair of levers and the load-carrying member.

7. In a vehicle, the combination of a load-carrying member, a front and rear axle positioned at a substantial distance forwardly and rearwardly, respectively, of the load-carrying member, thereby providing a wheel base materially longer than the load-carrying member, a pair of levers of the first class, having arms of unequal length, associated with the front axle and fulcrumed to the load-carrying member, with the long arms of the levers extending from their fulcrums to the front axle, springs coöperating with the short arms of said levers and secured to the load-carrying member directly above the fulcrums of said levers, a similar pair of levers associated with the rear axle and having pivotal connection with the load-carrying member, with the long arms of the levers extending from their fulcrums to the rear axle and crossing the long arms of the first-mentioned levers, and springs coöperating with the short arms of said latter pair of levers and secured to the load-carrying member directly above the fulcrums of said levers.

8. In a vehicle, the combination of a load-carrying member, a front axle, a rear axle, a pair of levers of the first class, having arms of unequal length, associated with the front axle and pivotally connected with the load-carrying member rearwardly of said front axle, with the long arms of the levers extending from their pivotal points to the front axle, resilient means positioned above said pivotal points coöperating with the short arm of each of said levers and the load-carrying member, a similar pair of levers associated with the rear axle and also pivoted to the load-carrying member forwardly of said rear axle, with the long arms of the levers extending from their pivotal points to the rear axle, and resilient means positioned above said pivotal points, coöperating with the short arms of said levers and the load-carrying member.

9. In a vehicle, the combination of a load-carrying member, a front axle, a rear axle, a pair of levers of the first class having arms of unequal length, associated with the front axle and pivotally connected with the load-carrying member rearwardly of said front axle, with the long arms of the levers extending from their pivotal points to the front axle, springs positioned above said pivotal points coöperating with the short arm of each of said levers and the load-carrying member, a similar pair of levers associated with the rear axle and also pivoted to the load-carrying member rearwardly of said rear axle, with the long arms of the levers extending from their pivotal points to the rear axle, and springs positioned above said pivotal points coöperating with the short arms of said levers and the load-carrying member.

10. In a vehicle, the combination of a load carrying frame, a front axle positioned a substantial distance forwardly of the load carrying frame, a rear axle positioned a substantial distance rearwardly of the load carrying frame, a pair of levers of the first class, having arms of unequal length fulcrumed to the load carrying frame intermediate the ends thereof with the long arms of said levers projecting forwardly and secured to the front axle and the short arms of said levers projecting rearwardly beyond the rear end of the frame, a second pair of similar levers fulcrumed to the load carrying frame intermediate its ends with the long arms of said levers extending rearwardly and secured to the rear axle, and the short arms of said levers extending forwardly beyond the front end of the frame, and springs secured directly to the load carrying frame at the front and rear ends thereof and extending in opposite directions with their free ends secured to the short arms of said levers.

11. In a vehicle, the combination of a load carrying frame, a front axle positioned a substantial distance forwardly of the load carrying frame, a rear axle positioned a substantial distance rearwardly of the load carrying frame, a pair of levers of the first class, having arms of unequal length fulcrumed to the load carrying frame intermediate the ends thereof with the long arms of said levers projecting forwardly and secured to the front axle and the short arms of said levers projecting rearwardly beyond the rear end of the frame, a second pair of similar levers fulcrumed to the load carrying frame intermediate its ends with the long arms of said levers extending rearwardly and secured to the rear axle on the short arms of said levers extending forwardly beyond the front ends of the frame, and leaf springs directly secured at the opposite ends of the load carrying frame and extending forwardly and rearwardly thereof with their outer ends secured to the short arms of the levers.

12. In a vehicle, the combination of a load-carrying member, a front axle, a rear axle, a pair of levers of the first class, provided with arms of unequal length and having pivotal connection with the load-carrying member, resilient means mounted near one end of the load-carrying member and projecting rearwardly of said member, the short arms of said levers being bent upwardly into coöperative engagement with said resilient means, and the long arms of the levers being bent downwardly into cooperative engagement with the front axle, resilient means mounted near the other end of the load-carrying member and projecting forwardly of said member, a similar pair of levers having their long arms bent downwardly into engagement with the rear axle and having their short arms bent upwardly into coöperative engagement with said latter resilient means, whereby the resilient means extend in opposite directions from the front and rear of the load carrying member and through their coöperation with the bent short arms of said levers serve to support the load carrying member in a position relatively close to the ground.

In testimony whereof I have signed my name to this specification.

CHARLES DRABEK.